(12) United States Patent
Harkness, IV et al.

(10) Patent No.: US 8,043,734 B2
(45) Date of Patent: Oct. 25, 2011

(54) OXIDIZED CONFORMAL CAPPING LAYER

(75) Inventors: Samuel Dacke Harkness, IV, Berkeley, CA (US); Zhong Stella Wu, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 12/178,540

(22) Filed: Jul. 23, 2008

(65) Prior Publication Data

US 2010/0021772 A1    Jan. 28, 2010

(51) Int. Cl.
*G11B 5/66* (2006.01)

(52) U.S. Cl. .......................................... 428/833

(58) Field of Classification Search .................. None
See application file for complete search history.

(56) References Cited

U.S. PATENT DOCUMENTS

| | | | | |
|---|---|---|---|---|
| 5,062,938 A * | 11/1991 | Howard | ...................... | 204/192.2 |
| 5,569,506 A * | 10/1996 | Jahnes et al. | ................ | 428/833.2 |
| 5,968,679 A * | 10/1999 | Kobayashi et al. | ......... | 428/831.2 |
| 6,660,413 B1 * | 12/2003 | Thangaraj et al. | .......... | 428/833.2 |
| 6,680,106 B1 * | 1/2004 | Thangaraj et al. | .......... | 428/833.2 |
| 2007/0087227 A1 * | 4/2007 | Ma et al. | ...................... | 428/833.1 |

* cited by examiner

*Primary Examiner* — Holly Rickman
(74) *Attorney, Agent, or Firm* — Foley & Lardner LLP

(57) ABSTRACT

The invention relates to granular perpendicular magnetic recording media with a capping layer comprised of a material having high surface mobility and low surface energy. The capping layer surface is oxidized to produce a passivating surface that is impervious to corrosion.

3 Claims, 3 Drawing Sheets

Carbon overcoat

Cap layer comprising a high surface mobility, low surface energy material

Perpendicular Magnetic layer

Carbon overcoat

Cap layer comprising a high surface mobility, low surface energy material

Perpendicular Magnetic layer

OXIDIZED CONFORMAL CAPPING LAYER

BACKGROUND

Perpendicular recording media are being developed for higher density recording as compared to longitudinal media. The thin-film perpendicular magnetic recording medium comprises a substrate and a magnetic layer having perpendicular magnetic anisotropy, wherein the magnetic layer comprises an easy axis oriented substantially in a direction perpendicular to the plane of the magnetic layer. Typically, the thin-film perpendicular magnetic recording medium comprises a rigid NiP-plated Al alloy substrate, or alternatively a glass or glass-ceramic substrate, and successively sputtered layers. The sputtered layers can include one or more underlayers, one or more magnetic layers, and a protective overcoat. The protective overcoat is typically a carbon overcoat which protects the magnetic layer from corrosion and oxidation and also reduces frictional forces between the disc and a read/write head. In addition, a thin layer of lubricant may be applied to the surface of the protective overcoat to enhance the tribological performance of the head-disc interface by reducing friction and wear of the protective overcoat.

Granular perpendicular recording media is being developed for its capability of further extending the areal recording density as compared to conventional perpendicular recording media which is limited by the existence of strong exchange coupling between magnetic grains. In contrast to conventional perpendicular media wherein the magnetic layer is typically sputtered in the presence of inert gas, most commonly argon (Ar), deposition of a granular perpendicular magnetic layer utilizes a reactive sputtering technique wherein oxygen ($O_2$) is introduced, for example, in a gas mixture of Ar and $O_2$. Not wishing to be bound by theory, it is believed that the introduction of $O_2$ provides a source of oxygen that migrates into the grain boundaries forming oxides within the grain boundaries, and thereby providing a granular perpendicular structure having a reduced exchange coupling between grains.

The process and materials used to manufacture granular perpendicular recording media produce a microstructure, which is prone to severe corrosion. To reduce overall overcoat thickness and to maintain corrosion performance, it is sometimes desirable to use cap layer in conjunction with the carbon overcoat. A conventional approach includes the application of metal capping layers and the intentional but controlled oxidation of the capping surface. The principal disadvantage to this approach is that there is frequently (if not always) imperfect surface coverage making the surface vulnerable to corrosive pitting.

The solution to this problem is thicker capping or carbon overcoat layers to improve surface coverage. However, thicker layers is detrimental to recording performance. Accordingly, there exists a need for a corrosion-resistant cap layer that would cover the entire surface evenly to prevent environmental agents from accumulating and attacking locally.

SUMMARY

The invention relates to magnetic recording media having a cap layer, where the cap layer contains a material having high surface mobility and low surface energy.

One embodiment of the invention is a magnetic recording medium comprising a substrate, a granular magnetic layer, a cap layer, and a carbon-containing or a silicon-containing overcoat directly on the cap layer, in this order, where the cap layer comprises a material having high surface mobility and low surface energy. In one embodiment, the material has a glass transition temperature of less than 2600 K and a surface energy of less than 2.6 $J/m^2$. According to one variation, the cap layer comprises a passivating oxide.

In another embodiment, the cap layer comprises a material selected from the group consisting of body-centered cubic metals, face-centered cubic metals, and oxides or alloys thereof. For example, the cap layer may comprise a material selected from the group consisting of Ti, Cr, Ta, Ag, Cu, oxides thereof, and their alloys. In one particular embodiment, the material is TiCr or $TiO_2$.

Another embodiment is a method of manufacturing a magnetic recording medium comprising obtaining a substrate, depositing a granular magnetic layer, depositing a cap layer, and depositing a carbon-containing or a silicon-containing overcoat directly on the magnetic cap layer, in this order, where the cap layer comprises a material having high surface mobility and low surface energy.

In one variation of this embodiment, the cap layer is sputter deposited onto the granular magnetic layer and its surface is oxidized. In another variation, the cap layer is formed by sputter depositing an oxide onto the granular magnetic layer.

Yet another embodiment is a cap layer for a magnetic recording medium comprising a material having high surface mobility and low surface energy.

Additional advantages of this invention will become readily apparent to those skilled in this art from the following detailed description, wherein only the preferred embodiments of the invention are shown and described, by way of illustration of the best mode contemplated for carrying out the invention. As will be realized, this invention is capable of other and different embodiments, and its details are capable of modifications in various obvious respects, all without departing from the invention. Accordingly, the drawings and description are to be regarded as illustrative in nature and not as restrictive.

BRIEF DESCRIPTION OF THE DRAWINGS

The present invention will be better understood by reference to the Detailed Description when taken together with the attached drawings, wherein.

DETAILED DESCRIPTION OF THE INVENTION

Figure 1:
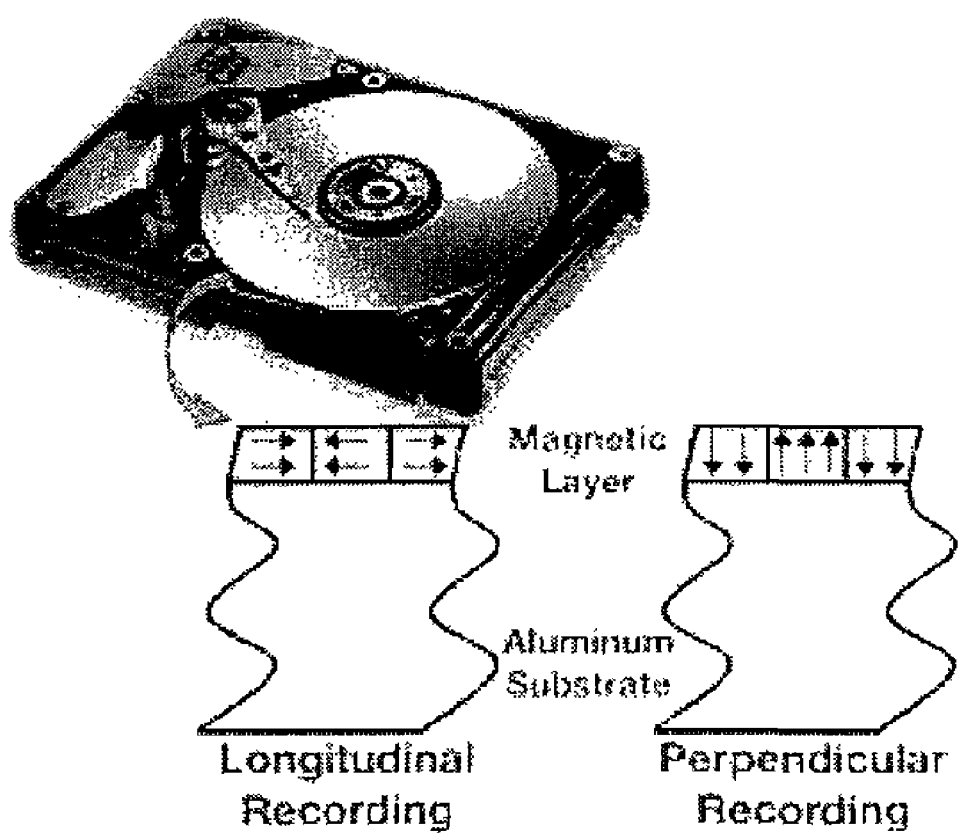
FIG. 1 schematically shows a magnetic disk recording medium comparing longitudinal and perpendicular magnetic recording.
Figure 2:
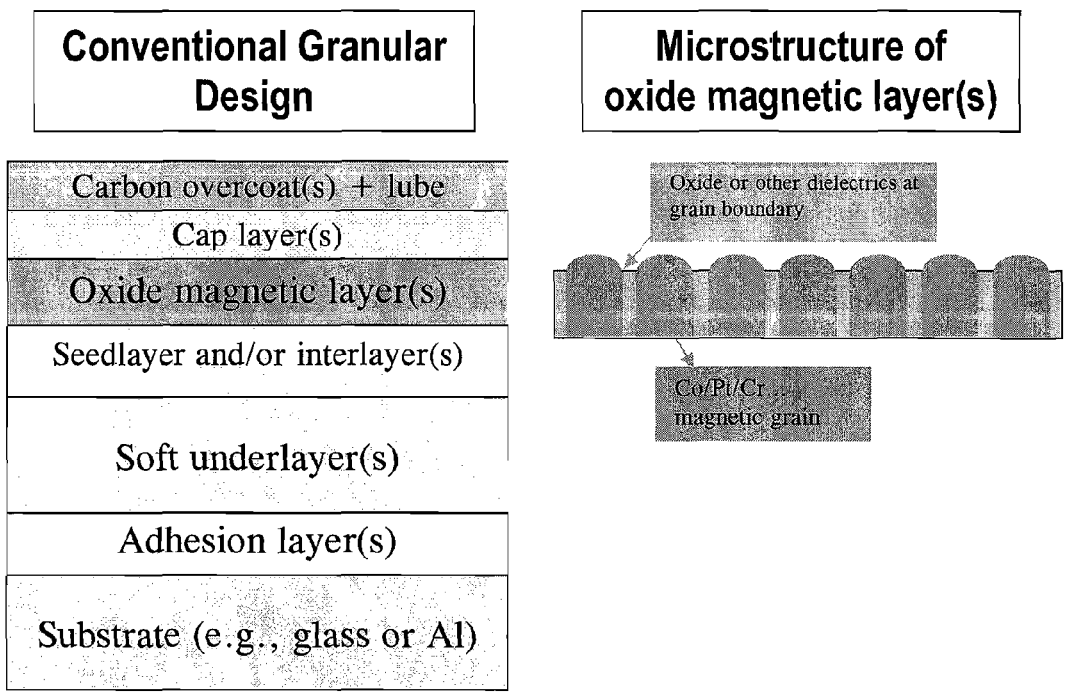
FIG. 2 shows a granular perpendicular magnetic recording medium.
Figure 3:
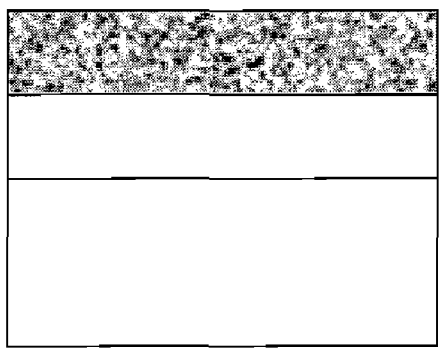
FIG. 3 shows a cap layer according to one aspect of the present invention and protective overcoat layer on a granular perpendicular magnetic layer.

The invention relates to granular perpendicular magnetic recording media having a capping layer comprised of a material having high surface mobility and low surface energy. A material having "high surface mobility" is one that has a glass transition temperature of less than 2600 K. A material having "low surface energy" is one that has a surface energy of less than 2.6 $J/m^2$.

Materials meeting these criteria will ensure conformal and complete coverage of the surface within a few monolayers. Examples of a material having high surface mobility and very low surface energy may be body-centered or face-centered cubic metals, such as Ti, Cr, Ta, Ag, and Cu, and their oxides and alloys, such as $TiO_2$ and TiCr.

The capping layer surface is oxidized to produce a passivating surface that is impervious to corrosion.

In one implementation, the capping layer is deposited onto a magnetic layer and its surface is oxidized. For example, a Ti capping layer may be deposited by sputter coating a magnetic layer of the recording medium. The surface of the Ti layer is then oxidized to $TiO_2$.

In another implementation, the capping layer may be deposited as an oxide directly. For example, $TiO_2$ may be sputter coated directly onto a magnetic layer of the recording medium.

As an added benefit of the capping layer of the present invention, the tribological properties of these oxides would enable reduced carbon overcoat thickness.

An embodiment of the media comprises, from the bottom to the top:
(1) Substrate: polished glass, glass ceramics, or Al/NiP.
(2) Adhesion layers to ensure strong attachment of the functional layers to the substrates. One can have more than one layer for better adhesion or skip this layer if adhesion is fine. The examples include Ti alloys.
(3) Soft underlayers (SUL) include various design types, including a single SUL, anti-ferromagnetic coupled (AFC) structure, laminated SUL, SUL with pinned layer (also called anti-ferromagnetic exchange biased layer), and so on. The examples of SUL materials include $Fe_xCo_yB_z$ based, and $Co_xZr_yNb_z/Co_xZr_yTa_z$ based series.
(4) Seed layer(s) and interlayer(s) are the template for Co (00.2) growth. Examples are RuX series of materials.
(5) Oxide containing magnetic layers (M1) can be sputtered with conventional granular media targets reactively (with $O_x$) and/or non-reactively. Multiple layers can be employed to achieve desired film property and performance. Examples of targets are $Co_{100-x-y}Pt_x(MO)_y$ and/or $Co_{100-z-y-z}Pt_x(X)_y(MO)_z$ series (X is the $3^{rd}$ additives such as Cr, and M is metal elements such as Si, Ti and Nb). Besides oxides in M1, the list can be easily extended such that the magnetic grains in M1 can be isolated from each other with dielectric materials at grain boundary, such as nitrides ($M_xN_y$), carbon (C) and carbides ($M_xC_y$). The examples of sputter targets are $Co_{100-x-y}Pt_x(MN)_y$, $Co_{100-x-y}Pt_x(MC)_y$ and/or $Co_{100-x-y-z}Pt_x(X)_x(MN)_z$, $Co_{100-x-y-z}Pt_x(X)_y(MC)_z$ series.
(6) Non-oxide containing magnetic layers (M2): The sputter targets can be used including conventional longitudinal media alloys and/or alloy perpendicular media. Desired performance will be achieved without reactive sputtering. Single layer or multiple layers can be sputtered on the top of oxide containing magnetic layers. The non-oxide magnetic layer(s) will grow epitaxially from oxide granular layer underneath. The orientation could eventually change if these layers are too thick. The examples of these are $Co_{100-x-y-z-\alpha}Cr_xPt_yB_zX_\alpha Y_\beta$.
(7) Oxidized, conformal cap layer as described above.
(8) Conventional carbon and lubricant layers can be adapted for the embodiment of the claimed media to achieve adequate mechanical performance.

The above layered structure of an embodiment is an exemplary structure. In other embodiments, the layered structure could be different with either less or more layers than those stated above.

Instead of the optional NiP coating on the substrate, the layer on the substrate could be any Ni-containing layer such as a NiNb layer, a Cr/NiNb layer, or any other Ni-containing layer. Optionally, there could be an adhesion layer between the substrate and the Ni-containing layer. The surface of the Ni-containing layer could be optionally oxidized.

The substrates used can be Al alloy, glass, or glass-ceramic. The magnetically soft underlayers according to present invention are amorphous or nanocrystalline and can be FeCoB, FeCoC, FeCoTaZr, FeTaC, FeSi, CoZrNb, CoZrTa, etc. The seed layers and interlayer can be Cu, Ag, Au, Pt, Pd, Ru-alloy, etc. The CoPt-based magnetic recording layer can be CoPt, CoPtCr, CoPtCrTa, CoPtCrB, CoPtCrNb, CoPtTi, CoPtCrTi, CoPtCrSi, CoPtCrAl, CoPtCrZr, CoPtCrHf, CoPtCrW, CoPtCrC, CoPtCrMo, CoPtCrRu, etc., deposited under argon gas (e.g., M2), or under a gas mixture of argon and oxygen or nitrogen (e.g., M1). Dielectric materials such as oxides, carbides or nitrides can be incorporated into the target materials also.

Embodiments of this invention include the use of any of the various magnetic alloys containing Pt and Co, and other combinations of B, Cr, Co, Pt, Ni, Al, Si, Zr, Hf, W, C, Mo, Ru, Ta, Nb, O and N, in the magnetic recording layer.

In a preferred embodiment the total thickness of SUL could be 100 to 5000 Å, and more preferably 600 to 2000 Å. There could be a more than one soft under layer. The laminations of the SUL can have identical thickness or different thickness. The spacer layers between the laminations of SUL could be Ta, C, etc. with thickness between 1 and 50 Å. The thickness of the seed layer, $t_s$, could be in the range of $1 Å < t_s < 50 Å$. The thickness of an intermediate layer could be 10 to 500 Å, and more preferably 100 to 300 Å. The thickness of the magnetic recording layer is about 50 Å to about 300 Å, more preferably 80 to 150 Å. The adhesion enhancement layer could be Ti, TiCr, Cr etc. with thickness of 10 to 50 Å. The overcoat cap layer could be hydrogenated, nitrogenated, hybrid or other forms of carbon with thickness of 10 to 80 Å, and more preferably 20 to 60 Å.

The magnetic recording medium has a remanent coercivity of about 2000 to about 10,000 Oersted, and an $M_rt$ (product of remanance, Mr, and magnetic recording layer thickness, t) of about 0.2 to about 2.0 memu/cm$^2$. In a preferred embodiment, the coercivity is about 2500 to about 9000 Oersted, more preferably in the range of about 4000 to about 8000 Oersted, and most preferably in the range of about 4000 to about 7000 Oersted. In a preferred embodiment, the $M_rt$ is about 0.25 to about 1 memu/cm$^2$, more preferably in the range of about 0.4 to about 0.9 memu/cm$^2$.

Almost all the manufacturing of a disk media takes place in clean rooms where the amount of dust in the atmosphere is kept very low, and is strictly controlled and monitored. After one or more cleaning processes on a non-magnetic substrate, the substrate has an ultra-clean surface and is ready for the deposition of layers of magnetic media on the substrate. The apparatus for depositing all the layers needed for such media could be a static sputter system or a pass-by system, where all the layers except the lubricant are deposited sequentially inside a suitable vacuum environment.

Each of the layers constituting magnetic recording media of the present invention, except for a carbon overcoat and a lubricant topcoat layer, may be deposited or otherwise formed by any suitable physical vapor deposition technique (PVD), e.g., sputtering, or by a combination of PVD techniques, i.e., sputtering, vacuum evaporation, etc., with sputtering being preferred. The carbon overcoat is typically deposited with sputtering or ion beam deposition. The lubricant layer is typically provided as a topcoat by dipping of the medium into a bath containing a solution of the lubricant compound, followed by removal of excess liquid, as by wiping, or by a vapor lube deposition method in a vacuum environment.

Sputtering is perhaps the most important step in the whole process of creating recording media. There are two types of sputtering: pass-by sputtering and static sputtering. In pass-by sputtering, disks are passed inside a vacuum chamber, where they are deposited with the magnetic and non-magnetic materials that are deposited as one or more layers on the substrate when the disks are moving. Static sputtering uses smaller machines, and each disk is picked up and deposited individually when the disks are not moving. The layers on the disk of the embodiment of this invention were deposited by static sputtering in a sputter machine.

The sputtered layers are deposited in what are called bombs, which are loaded onto the sputtering machine. The bombs are vacuum chambers with targets on either side. The substrate is lifted into the bomb and is deposited with the sputtered material.

A layer of lube is preferably applied to the carbon surface as one of the topcoat layers on the disk.

Sputtering leads to some particulates formation on the post sputter disks. These particulates need to be removed to ensure that they do not lead to the scratching between the head and substrate. Once a layer of lube is applied, the substrates move to the buffing stage, where the substrate is polished while it preferentially spins around a spindle. The disk is wiped and a clean lube is evenly applied on the surface.

Subsequently, in some cases, the disk is prepared and tested for quality thorough a three-stage process. First, a burnishing head passes over the surface, removing any bumps (asperities as the technical term goes). The glide head then goes over the disk, checking for remaining bumps, if any. Finally the certifying head checks the surface for manufacturing defects and also measures the magnetic recording ability of the disk.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

What is claimed is:

1. A magnetic recording medium comprising
    a substrate,
    a granular magnetic layer,
    a conformal cap layer, and
    a carbon-containing or a silicon-containing overcoat directly on the cap layer, in this order,
    wherein the cap layer consists of
        (1) a material selected from the group consisting of titanium and alloys of titanium, and
        (2) an oxidized form of the material on a surface of the cap layer.

2. The magnetic recording medium of claim 1, wherein the material selected for the cap layer also has a glass transition temperature of less than 2600 K.

3. The magnetic recording medium of claim 1, wherein the material selected for the cap layer also has a surface energy of less than 2.6 J/m$^2$.

* * * * *